(No Model.)
S. F. WEAVER.
CULTIVATOR.
No. 315,866. Patented Apr. 14, 1885.
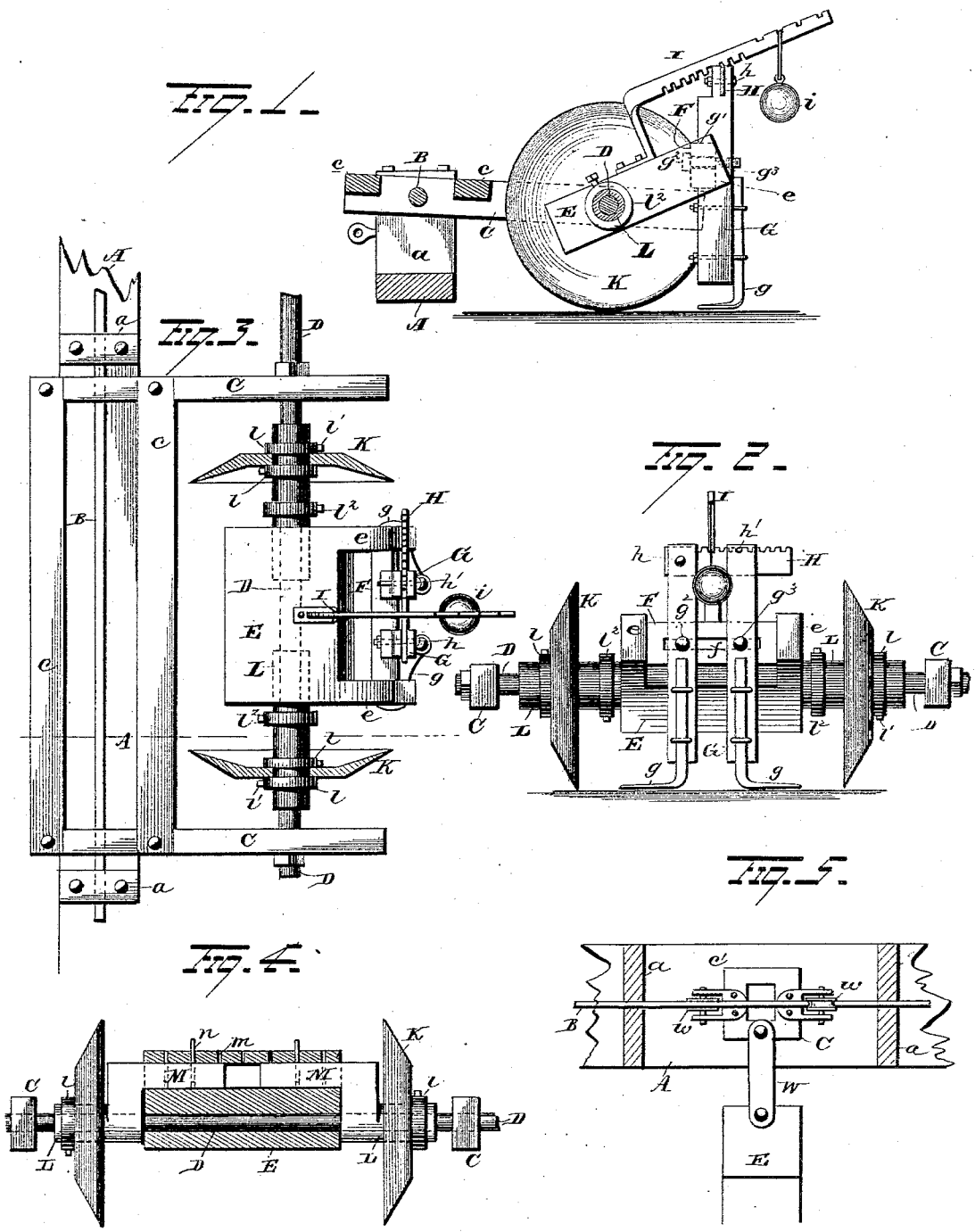
WITNESSES
INVENTOR
Solomon F. Weaver.
By H. A. Simpson.
Attorney

UNITED STATES PATENT OFFICE.

SOLOMON F. WEAVER, OF PORTIS, KANSAS.

CULTIVATOR.

SPECIFICATION forming part of Letters Patent No. 315,866, dated April 14, 1885.

Application filed January 10, 1885. (No model.)

*To all whom it may concern:*

Be it known that I, SOLOMON F. WEAVER, of Portis, in the county of Osborne and State of Kansas, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, and more particularly to cultivators for listed corn or other crop planted in rows between which there is a ridge of soil left.

My invention contemplates the cultivation of two or more rows simultaneously, and the employment for this purpose of independent cultivator-sections attached to a common leveler and draft attachment.

The object of my present invention is to provide rotary supporting-disks adapted to follow the irregularities of the ridge, and thereby guide the cultivator-knives in the desired position on each side of the row, or on the adjacent sides of two rows, a further object being to provide improved means for the adjustment of the disks and knives to suit rows different distances apart and cause the knives to run at different distances from the listed row and cut deeper or shallower.

With these ends in view my invention consists in certain features of construction and combinations of parts, as will be hereinafter described, and pointed out in the claims.

In the accompanying drawings, Figure 1 is a sectional view on line $x\ x$ of Fig. 3 of one of the cultivator-sections and a portion of the leveler and draft attachment. Fig. 2 is a rear view, and Fig. 3 is a plan view. Fig. 4 is a modification, and Fig. 5 a second modification.

A is the leveler, and is adapted to rest lightly across the ridges between the rows.

The leveler is provided with posts $a$ at suitable intervals, between which a cultivator-frame is attached on a pivotal rod, B, passing through the said posts $a$.

The cultivator-frame consists of two rearwardly-extending side rails, C, rigidly connected at or near their forward ends by a pair of cross-bars, $c$. The pivotal rod B passes through the side rails, C, between the cross-bars $c$, and the cultivator-frame is allowed a free rocking motion and a limited sliding motion thereon. An axle-rod, D, passes through the rear ends of the rails C. A rectangular-shaped box, E, is journaled on the rod D, the ends of the box extending rearwardly and forming the arms $e$, in the ends of which the rock-beam F is journaled. The beam F is provided with an oblong closed slot, $f$.

The cultivator-standards G, provided with knives $g$ and recesses $g'$, adapted to receive the beam F, are secured to the beam F in the desired lateral adjustments by means of set-screws $g^2$, which pass through the slot $f$ and threaded perforations $g^3$ in the standards G.

To adjust and hold the upper ends of the standards G at the proper distance apart, I provide a toothed bar, H, which is rigidly secured in the top of one of the standards by a bolt, $h$, or other suitable device, and adjustably secured in the top of the other standard by a catch or bolt, $h'$, which engages the notches in the bar.

The cultivator-standards as above constructed and attached have a forward and backward rocking motion, and are adjusted at the desired angle to the ground by means of a notched spring-bar, I, rigidly secured at one end to the box E, and provided at its rear end with a weight, $i$, sufficiently heavy to hold the bar I down in engagement with the bar H. The thickness of the bar I is such that it fits between two consecutive teeth on the bar H, and thus forms a mutual lock for the two bars H and I.

A pair of supporting and cutting disks, K, are journaled on the axle-rod D as follows: A pair of tubular hubs, L, each less than one-half the distance between the rails C in length, have a free rotary motion on the rod D, and project through the ends of the box E, the latter being journaled thereon. The disks K are secured in lateral adjustment on the tubular hubs L by means of collars $l$, provided with set-screws $l'$. The hubs are also secured in lateral adjustment on the rod D by means of collars $l^2$, which bear against the ends of the box E. The faces of the disks K are beveled, the edges toward the row being sharp and those opposite blunt. This shape of the disks causes them to constantly creep away from the higher portions of the ridges toward each other, and as the row becomes irregular the disks will follow the irregularities of the ridges and cause one or the other of the collars $l^2$, as the case may be, to press against the end of the box E, and thereby shift the cultivator-knives to the right or left and cause them to continually follow the row.

The modification represented in Fig. 4 consists in providing the tubular hubs L with crank-arms M on their inner ends, the upper ends of the said crank-arms having a laterally-sliding motion within a socket, N, formed in the upper portion of the box E, and the inner faces of the said crank-arms having a bearing against the ends of the box E. The disks K in this case are allowed a free rotary motion on the outer ends of the tubular hubs L, which are more properly termed "spindles," and as the disks K crowd to the right or left they move the tubular hubs L on the rod D and crowd the cultivator-knives to the right or left, as before. The upper ends of the crank-arms M are each provided with a perforation adapted to register with a series of perforations, m, formed in the top of the box E, which perforations are adapted to receive pins or bolts n, for locking the arms in any desired lateral adjustment with respect to the box E, and thereby determine the spread of the disks.

The box E, with its several attachments, may be thrown over on its axle-rod with cultivator-knives elevated, for going to and from the field or crossing rows of corn, &c.

Instead of securing the box-frame E to the draft-rod by means of the side rails, C, it may be connected to the rod B by means of a coupling, W, as shown in Fig. 5. A block or rectangular-shaped frame, C' c', is here provided with two pair of rollers, w, which embrace the opposite sides of the rod B and admit of a free lateral movement of the frame C' c' on the said rod, while the coupling W, being pivotally secured to both the frame C' c' and E, allows the frame E, carrying the cutting-disks K, a free lateral swing, as the disks and contour of the ground may determine.

It is evident that slight changes may be made in the form and arrangement of the several parts described without departing from the spirit and scope of my invention. For example, two or more disks might be placed on each side of the box E, instead of one only, as shown; hence I do not wish to limit myself strictly to the construction herein set forth; but, Having fully described my invention, what I claim as new, and desire to secure by Letters Patent, is—

1. The combination, with a common leveler, of cultivator-sections hinged thereto and provided with cutting-disks adapted to support and guide the cultivator-knives, substantially as set forth.

2. The combination, with a cultivator-frame and means for attaching the draft thereto, of a pair of cultivator-knives secured to the frame in a lateral adjustment, and supporting-disks adapted to automatically adjust the said knives, substantially as set forth.

3. The combination, with a cultivator-frame hinged to a draft-rod, and an axle-rod secured in the rear ends of the frame, of a pair of cultivator-knives journaled on the axle-rod in a free lateral adjustment, and disks journaled on sliding hubs adapted to automatically adjust the knives, substantially as set forth.

4. The combination, with the axle-rod secured in the rear ends of the frame, and cutters journaled on the axle, of a pair of cutting-disks secured in lateral adjustment on sliding hubs, whereby the disks are adjusted at the required distance apart and the cutters automatically caused to follow the row, substantially as set forth.

5. The combination, with the axle-rod, the box-frame journaled thereon, and a rock bar or beam journaled in the frame, of a pair of cutter-standards secured in lateral adjustment to the rock-beam, and means for locking the standards in the required angular adjustment, substantially as set forth.

6. The combination, with the axle-rod and the box-frame journaled thereon, and a pair of cutter-standards secured to the frame in lateral and angular adjustment, of a bar adapted to hold the upper ends of the standards at the required distance apart, and a notched spring-bar adapted to hold the standards in the required angular adjustment, substantially as set forth.

7. The combination, with the axle-rod and a cutter-frame journaled thereon in a free lateral adjustment, of beveled-faced disks mounted on the axle-rod, adapted to follow the irregularities of the row and automatically adjust the cutters, substantially as set forth.

8. The combination, with the frame carrying the cutters and adapted to be laterally adjusted by means of rotary supporting-disks, of a block or frame secured to the draft-rod by means of one or more pairs of rollers, and a coupling connecting the cutter-frame with the roller-frame, substantially as set forth.

In testimony whereof I have signed this specification in the presence of two subscribing witnesses.

SOLOMON F. WEAVER.

Witnesses:
IRA WEAVER,
J. C. WEAVER.